: 2,872,441

MONOAZO-DYESTUFFS INSOLUBLE IN WATER

Herbert Kracker, Reinhard Mohr, and Roland Bamberger, Offenbach (Main), Germany, assignors to Farbwerke Hoechst Aktiengesellschaft, Frankfurt am Main, Germany, a corporation of Germany No Drawing. Application May 27, 1957
Serial No. 661,610

Claims priority, application Germany June 6, 1956

6 Claims. (Cl. 260—157)

The present invention relates to new monoazo-dyestuffs insoluble in water, more particularly it relates to dyestuffs corresponding to the following general formula

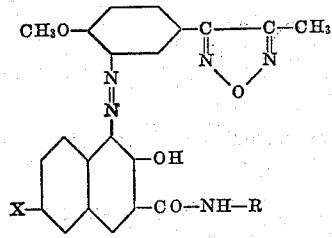

wherein R represents an aromatic radical and X stands for hydrogen or a halogen atom.

We have found that valuable monoazo-dyestuffs insoluble in water are obtained by coupling in substance, on the fiber or another substratum the diazonium compound of 3-(3'-amino-4'-methoxyphenyl)-4-methyl-1,2,5-oxdiazole having the following formula

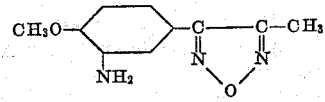

with an arylamide of 2-hydroxynaphthalene-3-carboxylic acid.

The above components may be applied by known dyeing processes to vegetable fibers including fibers of regenerated cellulose to produce valuable dyestuffs which are distinguished by good general fastness properties and in many cases by a very good fastness to peroxide. On synthetic fibers, such as fibers of acetyl cellulose or polyamides there can likewise be obtained valuable dyeings of good fastness properties.

The dyestuffs can also be prepared in substance or on a substratum adapted for the production of lakes and they can be used for coloring plastic masses of high molecular weight or for the manufacture of color lakes.

The 3-(3'-amino-4'-methoxyphenyl)-4-methyl-1,2,5-oxdiazole used as diazocomponent, which has not been described in the literature, can be prepared by known processes, for example by converting the monoxime obtained by reacting diazotized 1-amino-4-methoxybenzene with isonitroso-acetone into the dioxime of 4-methoxyphenyl-methyl-diketone, ring closure to the 3-(4'-methoxyphenyl)-4-methyl-1,2,5-oxdiazole, nitrating and subsequently reducing the 3-(3'-nitro-4'-methoxyphenyl)-4-methyl-1,2,5-oxdiazole so obtained to the amino compound. When recrystallized from ethyl alcohol the compound melts at 89–91° C.

The following examples serve to illustrate the invention but they are not intended to limit it thereto.

EXAMPLE 1

Cotton yarn is treated for 30 minutes at 35° C. in a goods-to-liquor ratio of 1:20 in the following impregnation bath, the material is then centrifuged and the dyeing is developed within 30 minutes in the developing bath described below. The material is then rinsed, soaped for 15 minutes at 60° C. and then for 15 minutes at 90° C., rinsed again and dried.

Impregnation bath 4.5 grams of 1-(2',3'-hydroxynaphthoylamino)-2,4-dimethoxy-5-chlorobenzene are dissolved in
13.5 cc. of denatured alcohol,
4.5 cc. of water of 40° C.,
1.5 cc. of sodium hydroxide solution of 38° Bé. and
1.5 cc. of a solution of formaldehyde of 33% strength.

After 10 minutes the solution is introduced into a mixture of 3 grams of a condensation product of fatty acids of high molecular weight with protein degradation products and
10 cc. of sodium hydroxide solution of 38° Bé. and made up with water to 1 liter.

Developing bath 2.05 grams of 3-(3'-amino-4'-methoxyphenyl)-4-methyl-1,2,5-oxdiazole are dissolved with a small amount of water,
1 gram of a reaction product of ethylene oxide with a fatty alcohol and
4 cc. of hydrochloric acid of 20° Bé. and the solution is diazotized with
0.8 gram of sodium nitrite dissolved in a small amount of water.

When the diazotization is complete the solution is diluted with water and made up to 1 liter after the addition of 1 gram of monosodium phosphate and
6 grams of disodium phosphate.

A Bordeaux red dyeing of very good fastness properties is obtained.

EXAMPLE 2

Cotton fabric is padded on the foulard with the following impregnation solution and dyed, after drying, in the developing bath described below. After an air passage of 30 seconds the material is rinsed hot and cold and then soaped at 95° C. with 1 g. of a reaction product of ethylene oxide with an alkyl phenol and 3 grams of sodium carbonate in 1 liter of water, rinsed again and dried.

Impregnation bath 14 grams of 1-(6'-bromo-2',3'-hydroxynaphthoylamino)-2-methoxybenzene are made into a paste with
15 cc. of Monopol Brilliant oil and
20 cc. of sodium hydroxide solution of 38° Bé., the mixture is made up to 1 liter with boiling water and dissolved by boiling.

Developing bath 10 grams of 3-(3'-amino-4'-methoxyphenyl)-4-methyl-1,2,5-oxdiazole are dissolved with
5 grams of a reaction product of ethylene oxide with a fatty alcohol,
20 cc. of hydrochloric acid of 20° Bé. and a small quantity of water, and the solution is diazotized with
4 grams of sodium nitrite dissolved in a small quantity of water.

When the diazotization is complete, 5 grams of monosodium phosphate and
30 grams of disodium phosphate, dissolved in water, are added to the solution which is made up to 1 liter with water.

A Bordeaux red dyeing of good fastness properties, especially of a very good fastness to peroxide is obtained.

The same dyeings as described in the foregoing examples can also be produced on regenerated cellulose fibers, such as rayon or staple fibers of regenerated cellulose according to the processes usual for these fibers.

It is also possible to prepare the dyestuffs in substance according to usual methods.

The following table indicates a number of further dyestuffs obtainable with the same diazo component and the shades of the dyeings produced on cotton, which likewise have good fastness properties.

| Coupling component | Shade |
|---|---|
| 2,3-hydroxynaphthoylaminobenzene | bluish red. |
| 1-(2', 3'-hydroxynaphthoylamino)-2-methoxybenzene | Do. |
| 1-(2',3'-hydroxynaphthoylamino)-2,5-dimethoxybenzene. | yellowish red. |
| 1-(2',3'-hydroxynaphthoylamino)-2,5-dimethoxy-4-chlorobenzene. | rust-red. |
| 1-(2',3'-hydroxynaphthoylamino)-naphthalene | ruby-red. |
| 1-(2',3'-hydroxynaphthoylamino)-2-methyl-4-methoxybenzene. | bluish red. |
| 1-(2',3'-hydroxynaphthoylamino)-4-methoxybenzene | yellowish red. |

We claim:
1. Water-insoluble monoazo-dyestuffs corresponding to the following general formula:

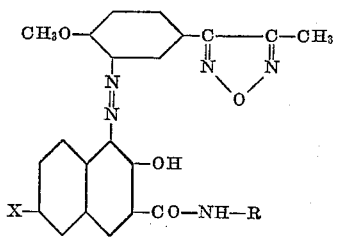

wherein R represents a member selected from the group consisting of phenyl, methoxyphenyl, dimethoxyphenyl, dimethoxy-chlorophenyl, methylmethoxyphenyl and naphthyl, and X stands for a member selected from the group consisting of hydrogen and bromine.

2. The water-insoluble azo-dyestuff corresponding to the following formula:

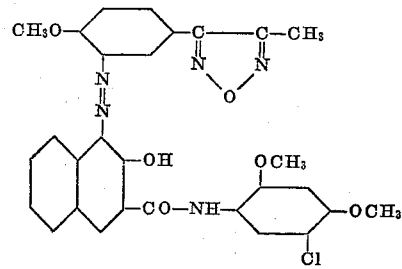

3. The water-insoluble azo-dyestuff corresponding to the following formula:

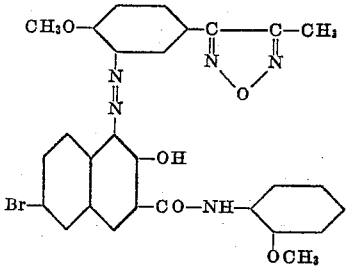

4. The water-insoluble azo-dyestuff corresponding to the following formula:

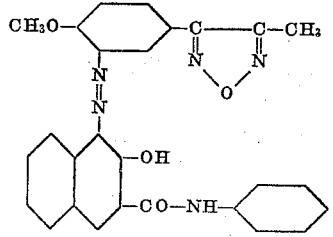

5. The water-insoluble azo-dyestuff corresponding to the following formula:

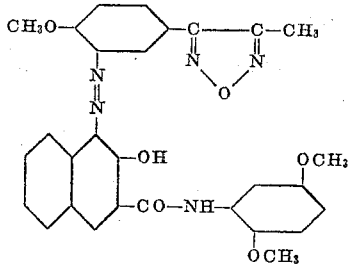

6. The water-insoluble azo-dyestuff corresponding to the following formula:

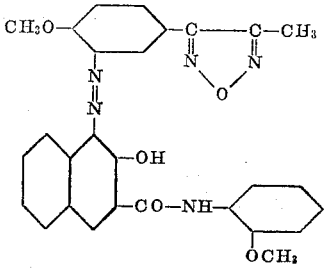

References Cited in the file of this patent

FOREIGN PATENTS 929,498    Germany _____ June 25, 1955